Patented May 27, 1930

1,760,133

UNITED STATES PATENT OFFICE

HAROLD C. HARRISON, OF COLUMBUS, OHIO, ASSIGNOR TO McLANAHAN-WATKINS CO., OF HOLLIDAYSBURG, PENNSYLVANIA, A PARTNERSHIP

REFRACTORY AND METHOD OF MAKING THE SAME

No Drawing.   Application filed December 22, 1924.   Serial No. 757,542.

This invention relates to ceramic refractory materials and has among its principal objects the provision of a refractory material of the ceramic type having more desirable properties under the conditions of actual use than similar materials hitherto known.

Among the many serious defects of ceramic refractories which were known prior to the present invention, perhaps the most objectionable are their tendency to soften or spall or to fail under the severe conditions to which they are normally subjected in use such as exposure to high temperatures, sudden or rapid fluctuations in temperature, subjection to various mechanical stresses or loads at high temperature ranges, as well as their tendency to flux to an objectionable degree with various materials with which they are necessarily or normally brought into contact at these high temperatures.

The present invention completely or largely overcomes these objections and defects by providing an improved non-vitreous refractory containing fifty per cent or more of a mineral belonging to the cyanite group and a high aluminous bond and further characterized by properties hereinafter more fully described.

While the refractory material of the present invention is particularly adapted to uses where strongly fluxing materials are excluded as in high temperature ceramic kilns, combustion chambers of high temperature boiler installations, and the like, it is also applicable generally where the older refractories have given unsatisfactory results because of their above mentioned defects.

The following example of my invention is given by way of illustrating the preferred form thereof, it being understood that the scope of my invention is in no wise limited by the particular conditions and means employed therein.

*Example.*—In the practice of my invention I may take 45 parts by weight of a cyanite concentrate comminuted to a fineness which passes a 28 mesh Tyles standard screen, but which is retained on a 48 mesh screen of the same standard; 23 parts by weight of a cyanite concentrate of a fineness to pass a 200 mesh screen of the same standard and 32 parts by weight of a bauxitic clay as a high aluminous bond of the type now commonly known to those skilled in the art as Georgia bauxitic clay. I have obtained good results with a cyanite concentrate which upon analysis showed the following composition:

|   | Per cent |
|---|---|
| $SiO_2$ | 38.54 |
| $Al_2O_3$ | 58.62 |
| $Fe_2O_3$ | 1.54 |
| $TiO_2$ | 0.64 |
| $P_2O_5$ | 0.02 |
| CaO | 0.10 |
| MgO | 0.24 |
| $K_2O$ | 0.00 |
| $Na_2O$ | 0.25 |
| Loss of ignition (over meeker type gas burner) | 0.27 |

This cyanite deforms at about cone 36. The bauxitic clay in the present example has approximately the following composition:

|   | Per cent |
|---|---|
| $SiO_2$ | 14.42 |
| $Al_2O_3$ | 56.23 |
| $Fe_2O_3$ | 0.96 |
| $TiO_2$ | 2.34 |
| $P_2O_5$ | 0.01 |
| CaO | 0.31 |
| MgO | 0.12 |
| $K_2O$ | 0.00 |
| $Na_2O$ | 0.00 |
| Sulphur | 0.06 |
| Moisture at 105° C | 0.46 |
| Loss of ignition (over meeker burner) | 25.41 |

This clay deforms at about cone 39. The clay is wet ground in a pebble mill to a creamy slip, with a water factor of about 2½ (2.5) and is added in this condition to the cyanite concentrate until completely mixed therewith. The resulting mixture is then de-watered by placing it upon a plaster of Paris absorption block covered with musline cloth to prevent contamination with calcium compounds until the watered content is reduced to between 5% and 15% or until the resulting mass will readily form by dry pressing. The material is then dry pressed at a pressure of about 600 lbs. per sq. in. It is then removed from the press and dried first in a hot air oven by gradually raising the temperature to 110° C., the time for reaching this temperature being about 16 hours and it is held at this temperature for about 2 hours. The dried unfired mass or brick is then fired to cone 30 in about 32 hours in a natural gas fired kiln having a volume of about 9 cubic feet.

As previously mentioned, I may vary the particular proportions and other factors in the preceding example without departing from the scope of my invention. Thus, I may use a cyanite concentrate in the raw batch containing anything above 85% cyanite mineral (i. e. a concentrate of cyanite mineral analyzing above about 53% aluminum). Also, for the high aluminous bond, I may use in place of the Georgia beauxitic clay a clay of the diaspore type or any other bonding material showing above about 65% $Al_2O_3$ on a calcined basis and having a plasticity of about that of the Georgia bauxitic clay or higher.

The cyanite concentrate or cyanite mineral may be substituted in the above example by any mineral of similar composition and character belonging to the cyanite group of mineral, it being understood that the term "cyanite group" and similar expressions as used herein includes besides cyanite itself the minerals sillimanite, and alusite and the variations of all three of these specific minerals, provided that in the group of minerals specified, the proportion of combined alkali and alkalin earth oxides or any group of these oxides is not in excess of about 1%.

Also, I may decrease the proportion of the cyanite mineral concentrate within the range of about 2%, adjusting the proportions of the other constituents accordingly. The proportion of the cyanite concentrate may be increased up to 100%, depending upon the result desired.

The degree of fineness of the cyanite and the relative proportions of the different grades of fineness thereof, the conditions of grinding, de-watering and drying the batch, as well as the condition of firing the dried mass, may be varied according to the results desired, all in accordance with practices and methods generally known to those skilled in the ceramic art.

In preparing the raw batch, I prefer to comminute the mineral to a degree of fineness such that no appreciable proportion of the mineral component of the raw batch will not pass a 10 mesh sieve of the Tyler standard. In other words, the maximum particle size should correspond in the main to material passing through the 10 mesh sieve.

The finished fired product of the present invention is characterized broadly not only by its content in mineral of the cyanite group and its high aluminous bonding material, but also by its very high refractoriness which is equal to and in many instances is superior to that of silica brick. It is further characterized by possessing a load carrying capacity approaching that of silica brick and a resistance to spalling superior to that of silica brick.

I claim:

1. The method of producing a refractory ceramic product which comprises first preparing a raw batch containing more than 50% by weight of a mineral belonging to the cyanite group and subsequently dry pressing the batch into the desired shape and firing the dry pressed article thus obtained.

2. In the method set forth in claim 1, comminuting a portion of the mineral to one degree of fineness and comminuting another portion of the mineral to a different degree of fineness and subsequently mixing the two portions to form the raw batch.

3. In the method set forth in claim 1, comminuting the mineral to a fineness such that no substantial proportion has an average particle size greater than that which will pass a 10 mesh sieve of the Tyler standard type.

4. A fired ceramic refractory material comprising more than 50% by weight of a mineral of the cyanite group and a high aluminous bond, the composition being substantially free from alkali or alkaline earth fluxes and the composition being characterized further by a refractoriness substantially as high as that of silica brick, a non-vitreous structure and a porosity substantially greater than that of porcelain.

5. A fired ceramic refractory material comprising more than 50% by weight of a mineral of the cyanite group and a high aluminous bond, the composition being substantially free from alkali or alkaline earth fluxes and the composition being characterized further by a refractoriness substantially as high as that of silica brick and a load carrying capacity approaching that of silica brick and a resistance to spalling greater than that of silica brick, a non-vitreous structure and a porosity substantially greater than that of porcelain.

6. The method of producing a refractory cermic product of the non-vitreous type having a porosity substantially greater than porcelain which comprises first preparing a raw batch, substantially free from alkali or alkaline earth fluxes and containing the mineral cyanite, forming the batch into the desired shape and subsequently firing the formed material thus obtained.

7. The method of producing a refractory ceramic product of the non-vitreous type having a porosity substantially greater than porcelain which comprises first preparing a raw batch, substantially free from alkali or alkaline earth fluxes and containing a concentrate of the mineral cyanite, the said concentrate possessing a degree of refractoriness corresponding to deformation at about cone 36, forming the raw batch into the desired shape and firing the formed article thus obtained.

8. A fired ceramic refractory material of the non-vitreous type having a porosity substantially greater than porcelain comprising fired mineral cyanite the material being substantially free from alkali or alkaline earth fluxes.

9. A fired ceramic refractory material of the non-vitreous type having a porosity substantially greater than porcelain comprising a fired concentrate of the mineral cyanite, the material being substantially free from alkali or alkaline earth fluxes and the said concentrate possessing a degree of refractoriness corresponding to deformation at about cone 36.

In testimony whereof I affix my signature.

HAROLD C. HARRISON.